United States Patent Office.

AARON W. STEWART, OF MIDDLETOWN, OHIO.

Letters Patent No. 71,810, dated December 3, 1867.

---

COMPOSITION FOR POLISHING KNIVES.

---

The Schedule referred to in these Letters Patent and making part of the same.

---

TO ALL WHOM IT MAY CONCERN:

Be it known that I, AARON W. STEWART, of Middletown, in Butler county, in the State of Ohio, have invented a new and useful Combination or Composition of Materials for Polishing Knives, and similar articles of metal; and I do hereby declare that the following is a full and exact description thereof.

The object of my invention or discovery is to provide for domestic use the means of cleaning and polishing table-knives, forks, spoons, and utensils of similar character, with the least expense and with the greatest facility.

The composition which I have found to be best suited for the purpose of polishing knives, &c., consists of equal parts of the following-named ingredients, viz, flour of emery, pulverized lava or rotten-stone, and plaster of Paris, mixed in a dry state with an equal quantity of pulverized soapstone.

This composition will be placed in a suitable receptacle for convenient access, and will be applied and used in the following manner, viz: A piece of cork of sufficient size is saturated in a solution of bicarbonate of soda and tartaric acid, equal parts, the solution being made with alcohol, and the cork so prepared is to be used as a brush, with which the powder or composition will be applied to the article to be polished. I have found, by experiment, that the cork, prepared in the manner described, is much better (on account of the fine "grain" imparted to it by the process described) for the purpose of polishing metals. The article to be polished will be first dipped into warm water, when the cork, with a small portion of the polishing-powder, composed of the four ingredients specified, adhering to it, will be vigorously rubbed upon the metal, in the usual manner of polishing knives and other similar articles.

It is well known that emery and other fine polishing-powders, which are in common use, will quickly brighten and clean metals, but metals which have been polished with these articles will (unless they are immediately oiled) soon become tarnished by exposure to the air. To avoid this injurious result, I have introduced both the plaster and the soapstone, which, as they contain proper modifying qualities, obviate the objections referred to.

It will be found that articles of domestic use, such as table-ware, can be cleaned and polished by the use of my composition in the briefest period of time, and without any injury to the finest surface, and, when so polished, the article will not corrode or tarnish by exposure to the air.

Having fully described my invention, what I claim, and desire to secure by Letters Patent, is—

The polishing-powder, consisting of equal parts of the articles specified, when applied and used with the prepared cork, in the manner and for the purposes described.

In testimony whereof I have hereunto set my hand, this 30th day of September, 1867.

A. W. STEWART.

Witnesses:
  H. P. K. PECK,
  W. HINKLEY.